(12) United States Patent
Asprovski et al.

(10) Patent No.: US 8,610,588 B2
(45) Date of Patent: Dec. 17, 2013

(54) DETECTION OF $CO_2$ LEAKAGE IN A CONTAINER

(75) Inventors: Zvonko Asprovski, Liverpool, NY (US); Suresh Duraisamy, Liverpool, NY (US)

(73) Assignee: Carrier Corporation, Farmington, CT (US)

( * ) Notice: Subject to any disclaimer, the term of this patent is extended or adjusted under 35 U.S.C. 154(b) by 162 days.

(21) Appl. No.: 12/745,757

(22) PCT Filed: Jan. 17, 2008

(86) PCT No.: PCT/US2008/051317
§ 371 (c)(1),
(2), (4) Date: Jun. 2, 2010

(87) PCT Pub. No.: WO2009/091399
PCT Pub. Date: Jul. 23, 2009

(65) Prior Publication Data
US 2010/0271221 A1    Oct. 28, 2010

(51) Int. Cl.
*G08B 17/00*    (2006.01)

(52) U.S. Cl.
USPC .............................. 340/632; 73/23.2; 62/371

(58) Field of Classification Search
USPC ........ 340/632; 73/23.2, 35.14, 35.17; 62/371, 62/440, 246, 452, 165, 132, 126, 125, 129
See application file for complete search history.

(56) References Cited

U.S. PATENT DOCUMENTS

| | | | |
|---|---|---|---|
| 5,215,498 A * | 6/1993 | Wong et al. ................... | 454/208 |
| 5,457,963 A | 10/1995 | Cahill-O'Brien et al. | |
| 5,974,815 A | 11/1999 | Hwang et al. | |
| 5,983,655 A | 11/1999 | Kistner et al. | |
| 6,385,980 B1 | 5/2002 | Sienel | |
| 6,431,060 B1 | 8/2002 | Gutheim | |
| 6,565,626 B1 | 5/2003 | Baker et al. | |
| 6,606,867 B1 | 8/2003 | Sienel | |
| 6,945,071 B1 * | 9/2005 | Simeone et al. ................. | 62/412 |
| 7,121,103 B2 * | 10/2006 | Itoh et al. ........................ | 62/173 |
| 2003/0227382 A1 | 12/2003 | Breed | |
| 2004/0079096 A1 | 4/2004 | Itoh et al. | |

FOREIGN PATENT DOCUMENTS

| | | |
|---|---|---|
| CN | 1118759 | 3/1996 |
| CN | 1353283 | 6/2002 |
| DE | 102005055756 A1 | 5/2007 |
| DE | 102006006963 A1 | 8/2007 |
| JP | 10311644 A | 11/1998 |

(Continued)

OTHER PUBLICATIONS

ISA/US International Search Report and Written Opinion dated Jul. 7, 2008 (6 pgs).

(Continued)

*Primary Examiner* — George Bugg
*Assistant Examiner* — Edny Labbees
(74) *Attorney, Agent, or Firm* — Cantor Colburn LLP

(57) ABSTRACT

A refrigerated container having a refrigeration system using $CO_2$ as the refrigerant, includes a sensing and warning system for sensing the $CO_2$ concentration in the container and responsively displaying the sensed condition in a display module so that an operator will be aware of excess levels of concentration which might present a hazardous condition and therefore should not enter the container until the condition is alleviated.

10 Claims, 3 Drawing Sheets

(56) References Cited

FOREIGN PATENT DOCUMENTS

| | | |
|---|---|---|
| JP | 2000355213 A | 12/2000 |
| JP | 2003504640 A | 2/2003 |
| JP | 2005240564 A | 9/2005 |
| JP | 2008290701 A | 12/2008 |

OTHER PUBLICATIONS

Extended European Search Report mailed Sep. 12, 2011.

Fundamental Process and System Design Issues in CO2 Vapor Compression Systems, Man-Hoe Kim, Jostein Pettersen, Clark W. Bullard, Progress in Energy and Combusion Science 30 (2004) 119-174.

Transport Refrigeration Using Carbon Dioxide in Transcritical Compression Cycle, Michael Sonnekalb and Stefan Saiz, Konvekta AG, The Earch Technologies Forum, Apr. 2004, 31 pages.

International Preliminary Report on Patentability issued Jul. 20, 2010 (5 pgs.).

* cited by examiner

DETECTION OF CO₂ LEAKAGE IN A CONTAINER

TECHNICAL FIELD

This invention relates generally to transport refrigeration systems and, more particularly, to a method and apparatus for detecting an excess level of $CO_2$ vapor in a container and providing an indication thereof to an operator.

BACKGROUND OF THE INVENTION

Refrigerated vehicles have longed been employed in a wide variety of applications including the storing and marketing of perishable commodities, particularly produce such as fruit and vegetables, as well as other perishable foods, including processed and frozen or chilled products such as ice cream or the like. The refrigerated vehicles contemplated by the present invention include, for example, truck trailers for road transport and piggy-back use, railroad cars and container bodies contemplated for land and sea service and the like. Accordingly, all such refrigerated containers are included within the present invention under the general designation of refrigerated containers or vehicles adapted to receive cargo in a refrigerated space.

Refrigeration systems for such refrigerated containers have generally used conventional refrigerants in a closed loop system which included an evaporator for cooling the air in the container. Because of environmental concerns, hydrochloro flourocarbons (HCFCS), such as R-22 have been discontinued and hydroflourocarbons (HFCS), such as R-134a, R-410a and R-407c have taken their place. However, because of these same environmental concerns, it has been desirable to replace the use of these HFCS with a more "benign" refrigerant which does not adversely react with the atmosphere. Accordingly, the use of $CO_2$ has now become attractive for use in vapor compression systems for refrigerated containers.

One characteristic of carbon dioxide as a refrigerant is that it has low critical temperature and therefore, most $CO_2$ refrigerant vapor compression systems are designed for operation in the transcritical regime. This requires that they operate at substantially higher pressure then when operating with conventional refrigerants, and special compressors are designed for that purpose. In order to accommodate these higher pressures, the other components and tubing must be robust in their design. Still, the likelihood of leakage occurring within this system is greater than when operating with a lower pressure system with conventional refrigerants.

Depending on where in the system a leak may occur, the $CO_2$ may be released to the outside atmosphere or to the inside of the container box. If released to the inside of the container box, the carbon dioxide concentration may create a potentially hazardous atmosphere to humans that may enter the container box. While the toxicity of $CO_2$ is not likely to be a problem, the corresponding reduction in available oxygen may be harmful to one entering the container box. In this regard, OSHA has indicated that the lowest acceptable oxygen concentration for shift-long exposure is 19.5%, which corresponds to a carbon dioxide concentration of about 60,000 ppm (6%).

The use of carbon dioxide sensors within a refrigerant container has been made, but for a different purpose and manner. That is, in so called "controlled atmosphere" refrigerated container systems, the concentration of nitrogen within the container is enhanced so as to thereby decrease the oxidization (i.e. ripening) that may occur during shipping and storage. Such a system is described in U.S. Pat. No. 5,457, 963. In such a system, there are certain types of cargo (e.g. asparagus, blueberry, blackberry, cantaloupe, fresh chili pepper) where the depletion of $CO_2$ within the container is detrimental to the cargo. Thus, a known technique is to sense when the percentage of $CO_2$ reaches a predetermined lower level and then responsively injecting $CO_2$ into the container from a pressurized vessel that is provided for that purpose.

What is needed is a method and apparatus for determining when the content of $CO_2$ has reached an undesirable higher level and providing notice thereof so that an operator does not enter the container under those conditions.

DISCLOSURE OF THE INVENTION

In accordance with one aspect of the invention, a $CO_2$ sensor is provided in a refrigerated container for the purpose of determining when the $CO_2$ concentration reaches a predetermined high threshold. An indication of this condition is then provided in a display so that an operator will be aware of the condition.

In the drawings as hereinafter described, one embodiment is depicted; however, various other modifications and alternate constructions can be made thereto without departing from the spirit and scope of the invention.

DETAILED DESCRIPTION OF THE INVENTION

Figure 1:
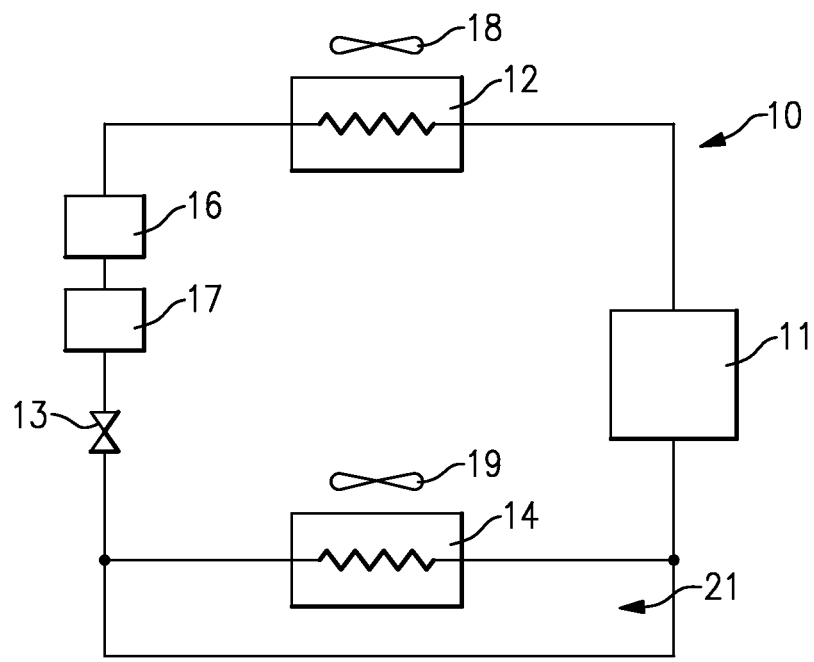
FIG. 1 is a schematic illustration of a container refrigeration system in accordance with the prior art.

A typical refrigerant vapor compression system using $CO_2$ as a refrigerant is shown generally at 10 in FIG. 1 to include a compressor 11, a heat rejecting heat exchanger 12, an expansion device 13, and a heat absorbing heat exchanger 14, all connected in serial flow relationship in a closed loop refrigeration cycle. The vapor compression system 10 may also include a filter/drier 16 and a flash tank receiver 17 connected in serial flow relationship between the heat rejecting heat exchanger 12 and the expansion device 13.

The compressor 11 functions to compress and circulate the $CO_2$ refrigerant through the refrigerant circuit, and may be a single multi-stage compressor having at least a first lower pressure compression stage and a second higher pressure compression stage, such as for example, a scroll compressor or a reciprocating compressor. It may also comprise a pair of compressors such as, for example, a pair of reciprocating or scroll compressors having a refrigerant line connecting the discharge outlet to the first compressor in refrigerant flow relationship with the suction inlet port of the second compressor. In the case of the single multi-stage compressor, each compressor stage would be driven by a single motor operatively connected to drive both stages, and in the case of a pair of compressors, each compressor would be driven independently by its own dedicated motor.

The refrigerant vapor compression system 10 is designed to operate in a subcritical cycle. Thus, the refrigerant heat rejecting heat exchanger 12 is designed to operate as a refrigerant condensing heat exchanger through which hot, high pressure $CO_2$ vapor discharge from the compressor 11 passes in heat exchange relationship with a cooling medium to condense the refrigerant passing therethrough from a refrigerant vapor to refrigerant liquid. The refrigerant condensing heat exchanger 12, which may also be referred to herein as a condenser, may comprise a finned tube heat exchanger, such as, for example, a fin and round tube heat exchanger coil or a fin and flat minichannel tube heat exchanger. In transport refrigeration system applications, the typical cool medium is ambient air passed through the condenser 12 in heat exchange relationship with the refrigerant by means of a fan 18 operatively associated with the condenser 12.

The heat absorbing heat exchanger 14 may be referred to as an evaporator and may be a conventional finned tube heat exchanger such as, for example, a fin and round tube heat coil or a fin and minichannel flat tube heat exchanger through which expanded refrigerant having transversed the expansion device 13 passes in heat exchange relationship with the heated fluid, whereby the refrigerant is vaporized and typically superheated. The heating fluid passed in heat exchange relationship with the refrigerant in the evaporator 14 may be air passed through the evaporator 14 by means of a fan 19 operatively associated with the evaporator 14, to be cooled and commonly also dehumidified and then supplied to the climate controlled environment 21 containing a perishable cargo such as, for example, refrigerated or frozen food items.

The flash tank receiver 17 typically operates with both liquid refrigerant and vapor refrigerant disposed therein. That is, a liquid refrigerant from the condenser 12 enters the flash tank receiver 17 and settles to the bottom of the tank. Since liquid will be at saturated temperature, refrigerant vapor will fill the space in the tank not filled by liquid refrigerant. Liquid refrigerant is metered out of the tank 17 by the expansion device 13 which controls refrigerant flow to the evaporator 14. As operating conditions of the subcritical refrigerant vapor compression system change, the charge requirements for the system will change and the liquid level in the receiver tank will rise or fall as appropriate to establish a new equilibrium liquid level.

Figure 2:
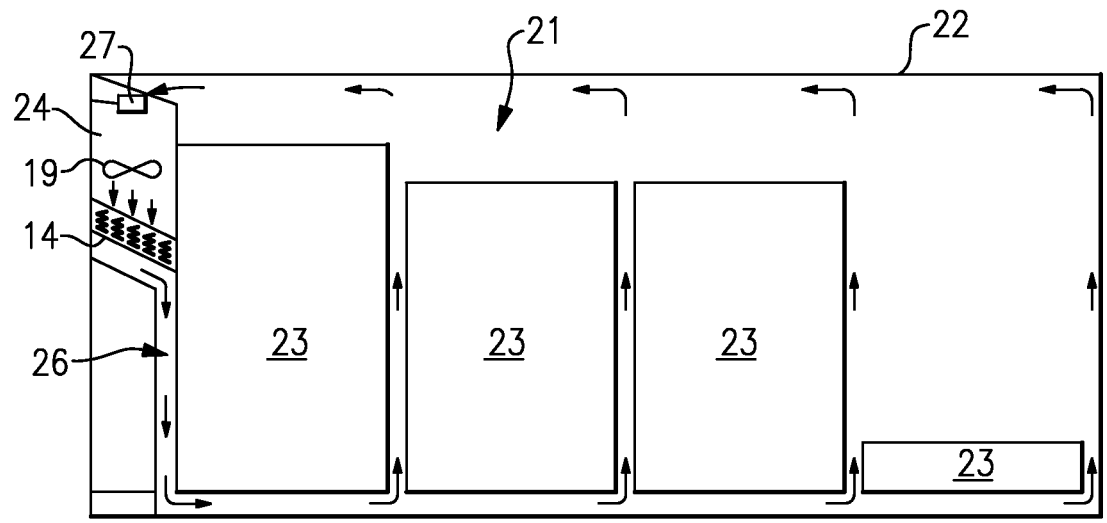
FIG. 2 is a schematic illustration of a refrigerated container in accordance with the present invention.

Referring now to FIG. 2, there is shown a cargo container 22 which is designed to contain cargo 23 that is stored in the climate controlled environment 21 for the purpose of maintaining the cargo 23 in a fresh and refrigerated conditioned. For that purpose, a refrigeration system 24 containing the vapor compression system 10, is operatively connected to one end of the cargo container 22 as shown. Thus, as indicated by the arrows, the air in the climate controlled environment 21 passes into the refrigeration system 24 and is passed, by way of the fan 19, through the evaporator 14 where it is cooled, after which it passes through the passage 26 back into the lower portion of the cargo container 22 and upwardly through the cargo 23 to complete the cycle.

Considering now that the vapor compression system 10 as shown in FIG. 1 contains $CO_2$ vapor in that portion of the circuit between the expansion device 13 and the condenser 12, with the vapor being at relatively high pressures up to 2250 psi (15.5 MPa), the possibility of leakage from that portion of the circuit must be recognized. Depending on where that leakage occurs, the $CO_2$ vapor may be released to the atmosphere, as would occur if it flowed from the left side of the refrigeration system 24 in FIG. 2, or to the climate controlled environment 21, if it were to flow to the right side of the refrigeration system 24. If it flows to the atmosphere, the adverse effects are minimal except for possible need to replenish the lost refrigerant. However, if the flow of $CO_2$ vapor is into the climate controlled environment 21 it may create an unsafe condition for the entry of a person within the container 22 since infusion of the $CO_2$ will necessarily deplete the associated concentration of oxygen in the space. This is particularly true as the amount of cargo in the space is increased.

Figure 3:
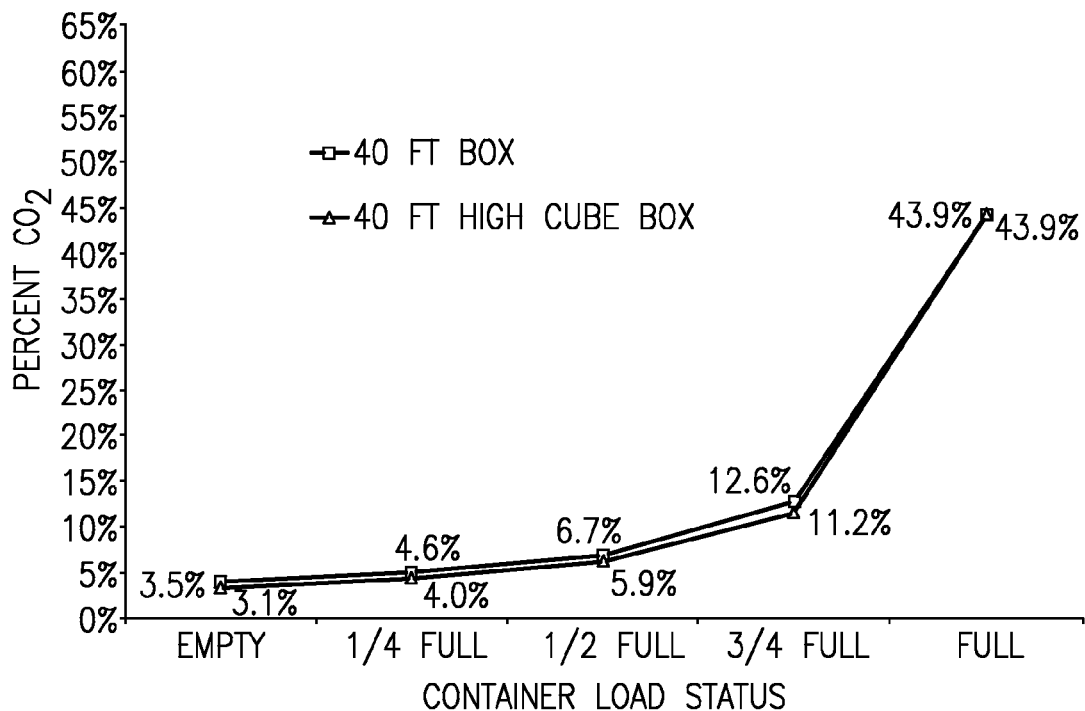
FIG. 3 is a graphic illustration of $CO_2$ concentration as a function of container load status.

Referring now to FIG. 3, there is shown a graphical representation of the relationship between the percentage of a full load (i.e. a filled container) and the percentage of concentration of $CO_2$ in the container. That is, if a leakage of a certain amount of $CO_2$ vapor enters the cargo container 22 in an empty condition, it will have the full volume of the container into which it will be dissipated, and the overall effect will be substantially less then when a load is included in the cargo container 22. On the other hand, when there is a substantial load of cargo 23 in the cargo container 22, as shown in FIG. 2, then the amount of space into which the leaked $CO_2$ may be dissipated is substantially reduced, and therefore the effect is substantially greater. The data in FIG. 3 therefore shows that the level of carbon dioxide concentration will vary from less than 4% if the container box is empty to over 40% carbon dioxide concentration if the container box is fully loaded.

Referring again to FIG. 2, it will be seen that, in accordance with the present invention, a $CO_2$ sensor 27 is installed within the refrigeration system 24 at a point where the return air from the cargo container 22 enters the refrigeration system 24. Sensor 27 is in a position to sample the air returning from the cargo container 22 to determine the concentration of $CO_2$ therein.

Figure 4:
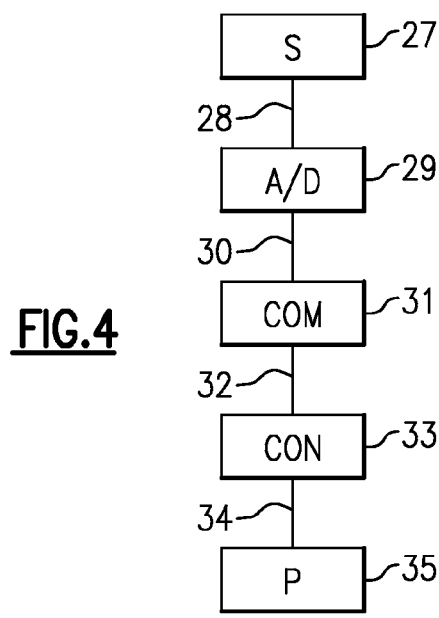
FIG. 4 is a schematic illustration of a control and display portion thereof.

The sensor 27 may be of a conventional type such as, for example, an infrared analyzer which is available from Texas Instruments. The manner in which the sensor 27 is electronically connected to related components is shown in FIG. 4.

The sensor 27 generates an analog signal representative of the concentration of $CO_2$ in the container 22. That analog signal is sent along line 28 to an analog-to-digital converter 29 with the representative digital signal being sent along line 30 to a controller 31. The controller 31 then sends a signal along line 32 to a display console 33 which, in turn, sends a signal along line 34 to generate a representative visual display at 35 so as to thereby alert an outside person of a potential hazardous atmosphere inside the container 22.

Figure 5:
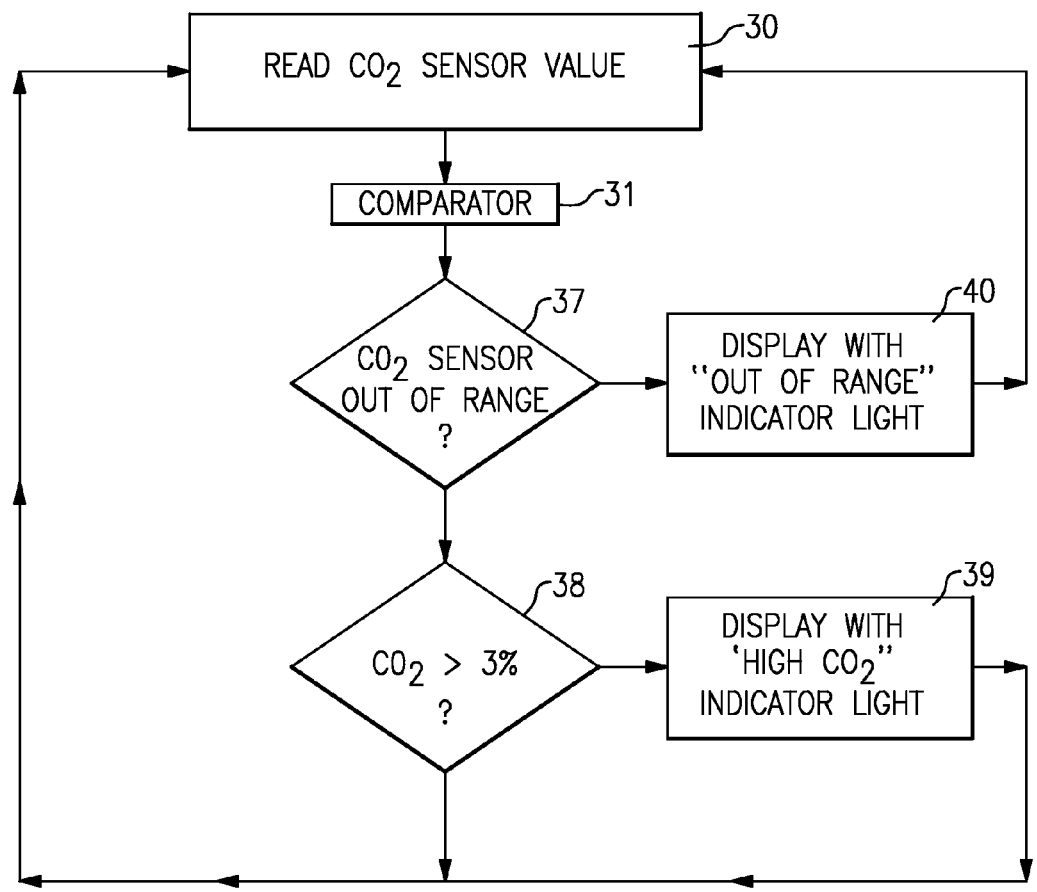
FIG. 5 is a flow diagram of the sensing and display process in accordance with the present invention.

Shown in FIG. 5 is a logic flow diagram to indicate the manner in which the controller 32 operates to provide an appropriate display at the display console 33. In block 30, the controller 32 reads the $CO_2$ sensor 27 every second while the unit is under power. A representative signal is then sent to a comparator 36 and compared with a predetermined threshold in the range of 1% and 8%, such as 3%, for example. So long as the $CO_2$ concentration is indicated as being below a predetermined level, as indicated by the block 40, a signal is sent to the display console 33 and an appropriate indicator 37 is visually displayed at 35 to show that the condition in the cargo container 22 is "all clear" for entry of a person therein. However, when the controller 32 indicates that the level of $CO_2$ concentration in the cargo container 22 is above a predetermined level, such as three percent, for example, as indicated at block 38, then a signal will be sent to the display console 33 and an appropriate "High $CO_2$" visual display will be shown at 35 to indicate to an operator that a hazardous condition exists within the cargo container 22 and that it should not be entered until appropriate action has been taken, such as, for example, the cargo container 22 is vented by opening the doors and allowing for the escape of $CO_2$ gases that are trapped therein.

As part of the operating protocol, an operator will be instructed by appropriate notices posted on the unit, by operating manuals, and possibly by appropriate instructions provided on the display console 33, that, in order to avoid a hazardous condition, the operator should check the display console to ensure that the hazardous condition does not exist at the time.

Although the present invention has been particularly shown and described with reference to one embodiment as illustrated by the drawings, it will be understood by one skilled in the art that various changes in detail may be made thereto without departing from the spirit and scope of the invention as defined by the claims.

We claim:

1. A refrigerated container system comprising:
   a refrigeration system including a refrigeration circuit having in serial flow relationship a compressor for compressing $CO_2$ vapor as a refrigerant, a heat rejecting heat exchanger, an expansion device and a heat absorbing heat exchanger;
   a refrigerated cargo container having said heat absorbing heat exchanger disposed in heat exchange relationship with a flow of return air from said refrigerated cargo container;
   a $CO_2$ sensor located within said flow of return air for sensing when a level of $CO_2$ concentration therein reaches a predetermined higher level and for generating a signal representative thereof said $CO_2$ sensor being in a position to sample the flow of return air entering the refrigeration system to the $CO_2$ concentration therein;
   and a control for receiving said representative signal and responsively generating a visual display of the sensed condition.

2. The refrigerated container system as set forth in claim 1 wherein said $CO_2$ sensor is disposed within said refrigerant system.

3. A method of reducing the risk of an operator entering a cargo container which may contain $CO_2$ leakage from an associated vapor compression refrigeration system for cooling the cargo container comprising the steps of:
   sensing the concentration of $CO_2$ in a flow of return air entering the refrigeration system from the cargo container and generating a representative signal thereof;
   providing a controller for receiving said representative signal and for providing an appropriate display signal in response thereto; and
   providing a display console for receiving said display signal and generating an appropriate visual display thereof.

4. The method as set forth in claim 3 wherein said display indicates that either a hazardous condition is present in the container or that no hazardous condition is present in the cargo container.

5. The method as set forth in claim 3 and including the step of comparing said representative signal with a predetermined threshold, and with the display providing an indication of whether that threshold has been exceeded.

6. The method as set forth in claim 5 wherein said predetermined threshold is in the range of 1% and 8%.

7. The method as set forth in claim 6 wherein said threshold is about 3%.

8. The method as set forth in claim 3 wherein said display console generates a visual display to alert a person outside the cargo container of a potential hazardous atmosphere inside the cargo container.

9. The refrigerated container system as set forth in claim 1 wherein said refrigerated cargo container comprises a truck-trailer.

10. The refrigerated container system as set forth in claim 1 wherein said refrigerated cargo container comprises a container for land and sea service.

* * * * *